United States Patent Office
3,781,265
Patented Dec. 25, 1973

3,781,265
METHOD OF PREPARING CONSISTENTLY HIGH-QUALITY VINYLIDENE FLUORIDE POLYMER
Julius Eugene Dohany, Berwyn, Pa., assignor to Pennwalt Corporation, Philadelphia, Pa.
No Drawing. Filed Oct. 17, 1972, Ser. No. 298,328
Int. Cl. C08f 3/22, 15/08
U.S. Cl. 260—92.1 R                    5 Claims

ABSTRACT OF THE DISCLOSURE

Vinylidene fluoride polymers of high-quality are prepared consistently by a process of suspension polymerization in which the chain transfer agent (acetone), initiator (diisopropylperoxydicarbonate), reaction accelerator (1,1,2-trichlorotrifluoroethane) and monomer are fed incrementally to the aqueous reaction medium.

---

This invention concerns a process for the preparation of thermally stable, high molecular weight vinylidene fluoride polymers in aqueous suspension. More particularly, in the process of preparing vinylidene fluoride polymer by polymerizing vinylidene fluoride monomer (and comonomer or comonomers) in aqueous medium (in a polymerization reactor with agitation) containing a suspending agent, diisopropylperoxydicarbonate as initiator, 1,1,2-trichlorotrifluoroethane as reaction accelerator, and acetone as chain transfer agent, this invention deals with the improvement in which the reaction accelerator, initiator and chain transfer agent are fed incrementally to the aqueous reaction medium simultaneously with the incrementally to the aqueous reaction medium simultaneously with the incremental addition of monomer, and the reaction process is continued until the desired amount of monomer is fed thereto.

The term "vinylidene fluoride polymer" used herein for brevity includes both normally solid, high molecular weight homopolymers and copolymers within its meaning. Such copolymers include those containing at least 50 mole percent of vinylidene fluoride copolymerized with at least one comonomer selected from the group consisting of tetrafluoroethylene, chlorotrifluoroethylene, trifluoroethylene, hexafluoropropene, vinyl fluoride, pentafluoropropene and ethylene. A particularly preferred class of copolymers embodied herein are those composed of from at least 70 and up to 99 mole percent vinylidene fluoride and correspondingly from 1 to 30 percent tetrafluoroethylene. Terpolymers of vinylidene fluoride, hexafluoropropene and trifluoroethylene, such as described in the copending application of J. E. Dohany and A. C. Whiton, Ser. No. 174,216, filed Aug. 23, 1971, are a representative class of vinylidene fluoride copolymers which can be prepared by the process embodied herein. An especially preferred class of such terpolymers are those composed of at least 60 and up to 70 mole percent vinylidene fluoride, from 2 to 5 mole percent trifluoroethylene and the balance hexafluoropropylene.

There has recently issued a number of patents concerned with either emulsion or suspension polymerization of fluorinated ethylenes, for example, U.S. 3,437,648; U.S. 3,475,396; U.S. 3,553,185; U.S. 3,574,178; U.S. 3,600,369; and U.S. 3,624,064. However, there has been a pressing need for a process which the present invention fulfills, embodying the suspension polymerization of vinylidene fluoride to provide a bead-like polymer product with good reproducibility, i.e., having consistently high quality, for example, with regard to thermal stability, desired molecular weight range, particle size, rheological properties, proper feed and flow characteristics and good mechanical properties. Moreover, this invention fills the need for a polymerization process that provides an aqueous suspension of vinylidene fluoride polymer having a relatively high ratio of polymer solids to liquid fill, if so desired. The process is so flexible that although the aqueous suspension of polymer produced herein may have a solids concentration as low as about 10 percent by weight, suspensions of vinylidene fluoride polymer on the order of about 35 to 60 weight percent solids can be readily synthesized using the process, compared to suspensions from conventional processes ranging, at the maximum, from about 10 to 30 weight percent. The advantageous economics of the present process are, therefore, apparent since the attainment of higher solids polymer suspensions, in effect, increases the capacity of the available commercial polymerization reactors to yield increased product output without the need for increased capital investment. The increased reactor throughput rate of this process is also enhanced by the achievement of a higher reaction rate by its use than is obtainable by previous methods of polymerization.

The initial step in the poymerization technique embodied herein is to charge to the reactor the water used as the reaction medium, preferably deionized water, the amount thereof ranging from about 60 to about 510 by weight per 100 parts by weight of total monomer ultimately to be fed to the reactor, and preferably from about 100 to 150 parts per hundred parts of monomer. A suspending agent is incorporated in the water in an amount within the range of about 0.01 to 1%, preferably from 0.05 to about 0.4%, based on the weight of the total monomer ultimately charged to the reactor. Suitable suspending agents include polyvinyl alcohol, polyethylene oxide, methyl cellulose, methoxylated - propoxylated methyl cellulose, hydroxyethyl cellulose, hydroxypropylmethyl cellulose and others known in the art. Then, as is usual in vinylidene fluoride polymerization, the reactor is subjected to a series of evacuations and nitrogen purges to ensure an oxygen-free environment for the polymerization. The reactor is then heated to the desired reaction temperature.

Optionally, up to about 20% of the total monomer ultimately to be fed may be added to the reactor to attain the desired reaction pressure at the proposed reaction temperature before the addition and heating of the other ingredients, or in the alternative, the initial monomer charge is fed incrementally and simultaneously with the other ingredients. The process is operable at pressure of from about 300 to 1000 p.s.i.g., preferably from 400 to 700 p.s.i.g. The pressure is maintained for the duration of the polymerization run by the incremental monomer feed. The reaction may be pursued at the end of the run (after the total of the monomer has been fed) down to a pressure of about 150 p.s.i.g. in order to increase the ultimate yield of polymer.

The initiator (diisopropylperoxydicarbonate, hereinafter referred to as "IPP"), the reaction accelerator (1,1,2-trichloro-1,2,2-trifluoroethane) and the chain transfer agent, i.e., molecular weight modifier (acetone), are fed incrementally or substantially continuously to the reactor together with simultaneous incremental or substantially continuous feed of the monomer, through another inlet. It is convenient to add the initiator, trichlorotrifluoroethane and acetone as a mixture since the fluorochlorocarbon advantageously serves as solvent for the relatively minor proportion of initiator involved in the reaction. More explicity, the amount of IPP used is in the range of about 0.05 to about 1.5 weight percent, preferably from 0.15 to 1 weight percent, based on the total weight of monomer ultimately fed to the polymerization reactor. In general, the initiator concentration is chosen so that it provides sufficiently high free radical concentration to promote the desired polymerization rates. However, excessive initiator concentration will have a detrimental effect on the thermal stability of the polymer product. Accordingly, the chain transfer agent is essential to regulate the molecular weight of the polymer. Such an agent must be miscible with the IPP initiator in the chlorofluoroethane accelerator, and not shorten the storage stability of the initiator solution. Acetone has been found to meet all such requirements for the chain transfer agent. The proportion of acetone will range from about 0.5 to 5.5 weight percent, preferably 1 to 3 weight percent, of total monomer feed. In short, the acetone provides molecular weight control of the polymer while at the same time permitting the use of adequate amounts of IPP to ensure good reaction rate. Other solvents tried as molecular weight control agents were unsatisfactory. For example, cyclohexane and isopropanol are effective chain regulators but have an adverse effect on polymerization rate while methanol has no adverse effect on polymerization rate but does not effectively control the molecular weight of the polymer. Acetone, however, is both an effective chain transfer agent and compatible diluent for the initiator solution, and is not detrimental to polymerization rate or thermal stability of the polymer product.

The proportion of trifluorotrichloroethane (reaction accelerator) used is a critical aspect of the process. Too little of this solvent will have an adverse effect on the rate of polymerization, and too great an amount will cause the preparation of a vinylidene fluoride polymer that will engender difficulties in fabrication by melt-processing techniques (e.g., extrusion and molding) because of entrapped volatiles in the polymeric beads. The critical proportion of the trichlorotrifluoroethane in the process has been found to be in the range of 10 to 50 weight percent, preferably from 20 to 30 weight percent, of total monomer ultimately fed to the reaction.

The temperature of the polymerization reaction is maintained within the range from 35 to 100° C. Preferred reaction temperatures are from 40 to 85° C. The temperature is conveniently controlled by expeditious feed of cooling medium to the jacket of the reactor. As stated previously, the pressure in the polymerizer during the reaction will range from about 300 to 1000 p.s.i., usually from about 400 to 700 p.s.i.

The monomer and the initiator, chain transfer agent, and reaction accelerator are fed incrementally or substantially continuously to the reactor at a rate measured by the conversion of monomer to polymer varying within the range of about 30 to 250 grams monomer converted per liter of reaction mixture per hour. The preferred reaction rates are from 60 to 150 grams/liter x hour. Total yield of polymer will generally be on the order of at least 90 to 95%.

The vinylidene fluoride polymer is recovered as an aqueous suspension of high molecular weight, discrete bead-like polymer particles within the particle size range of about 50 up to about 1000 microns. As mentioned previously, the process of this invention is adapted to the production of relatively concentrated aqueous suspensions of vinylidene fluoride polymer, especially those containing from about 40 to 60 weight percent polymer solids. Because aqueous product suspensions containing on the order of only about 10 to 25 percent polymer are normally possible in conventional vinylidene fluoride suspension polymerization processes, the operation of the process embodied herein is tantamount to obtaining a 60 to 500 percent increase in reactor capacity without additional major capital investment.

Another surprising aspect of this invention is the consistency of the high quality of the polymer product, that is, the small deviation in properties of the polymer from one synthesis to the next, for a given set of polymerization variables. More particularly, such consistency is noted in representative physical properties such as molecular weight, rheological characteristics and thermal stability.

The heat stabilities of the polymers are measured by a standard oven test in which 11 grams of powdered polymer in an aluminum dish is held in an oven at 270° C. for one hour, air cooled, compared with color standards and rated as either excellent, very good, good, fair-plus, fair or poor. The molecular weights of the polymers are gauged by determining the "plasticity number" which is an empirical index related to melt flow. The plasticity number is the area in square millimeters of a plaque made by placing 0.5 gram of polymer powder piled in a cone between the platens of a Carver press heated to 225° C. The platens are brought together to compress the powder under slight pressure (less than 50 p.s.i.) between the heated platens and the powder is preheated in this manner at 225° C. for 30 seconds. A pressure of 2500 p.s.i. is then applied for sixty seconds at platen temperature of 225° C. The greater the area of the polymer plaque so produced, the lower the molecular weight of the polymer, and conversely. The vinylidene fluoride polymers prepared in accordance with this invention have plasticity numbers within the range of about 1800 to 4000. Another property of the polymers which is indicative of melt-processability is the "Brabender Value" which is a means of evaluating melt processing characteristics of polymers with regard to torque requirements and response to shear temperature and time. The evalution is made with the Brabender Plastograph (Brabender Corp., New Rochelle, N.Y.), at 100 r.p.m. and 225° C. The polymers produced herein have Brabender values on the order of about 1120 to 3000 m-g. The apparent melt viscosities of the polymers are determined in the Sieglaff-McKelvey capillary rheometer (product of Tinius-Olsen Testing Machine Co., Willow Grove, Pa.) with a capillary having an L/D (i.e., length over diameter) of 26, at 450° F. and at 100 sec.$^{-1}$ shear rate. The apparent melt viscosities of the polymers produced herein range from 10,000 to 40,000 poise.

The following examples illustrate and clarify the process of the invention. Examples 1-5 demonstrate the incremental addition technique and the consistency of results obtained therewith. Example 6 employs the conventional "slug method" of reactants addition for comparison. The results show that incremental addition of the initiator-accelerator solution and monomer provide an unexpected improvement and allow control over the polymerization rate during the entire reaction period and greatly improve consistency of the operation. The prior art, represented, for example, by U.S. 3,437,648, teaches the addition of the entire amount of initiator to the reaction at the beginning of each batch cycle. Polymerization according to these known methods gives reaction rate curves with a characteristic surge in the rate shortly after initiation to a very high maximum rate, which is followed by an abrupt drop in the rate protracted to the end of the run. The consistency of operations according to the prior processes is poor from batch to batch and the quality of the polymer generally unsatisfactory. In contrast, the polymerization rate of the novel process of this invention is controlled by the rate of initiator addition together with other ingredients, giving a controlled and gradually increasing polymerization reaction rate. Consequently, under the present mode of operation, the initiator concentration is initially zero and increases a symptotically, either to a steady state level or continuously until the end of the batch cycle. These situations are essentially equivalent and are highly reproducible and easily controlled.

EXAMPLE 1

In each of a series of five runs, a horizontal, stainless steel autoclave equipped with a paddle agitator is charged with 2980 ml. deionized water and 880 ml. of a 0.5%, aqueous solution of hydroxyethyl cellulose ("Cellosize QP 15000," a product of Union Carbide Corporation). The reactor is sealed, evacuated, purged with nitrogen, re-evacuated and charged with nitrogen to slightly above atmospheric pressure. Agitation is started, the contents of the reactor heated to 50° C. and then pressurized to 500 p.s.i.g. by the addition of about 454 grams of vinylidene fluoride monomer, which amount is 16 weight percent of the total monomer ultimately fed to the reactor. At this point, 16 volume percent (i.e., 96 ml.) of a solution of 39.6 of acetone, 20 g. of diisopropylperoxydicarbonate (IPP) and 820 g. of $CCl_2FCClF_2$ is added to the reactor by positive displacement pump. Initiation of the polymerization reaction occurs and the charging of said solution and additional monomer is resumed at a proportion of 276 g. solution (211 ml.) per kilogram of monomer. The pressure, temperature and agitation are maintained until a total of 2840 g. monomer is fed. The pressure is reacted down to 400 p.s.i.g. and agitation stopped. Reaction times for the five runs range from 4.48 to 5.07 hours. The average polymerization rate is 107 g./liter x hour (monomer feed time). The yields range from 84.8 to 92.7% with an average of 88.3%. The vinylidene fluoride polymer product from the several runs has the following physical characteristics.

| Property | Minimum | Maximum | Average |
|---|---|---|---|
| Brabender value, m-g | 1,435 | 1,755 | 1,530 |
| Plasticity number, mm.² | 3,070 | 3,325 | 3,225 |
| Melt viscosity at 100 sec.⁻¹, poise | 20,350 | 23,800 | 2,530 |
| Color rating | (¹) | (¹) | (¹) |

¹ All fair plus.

EXAMPLE 2

A series of eight polymerization runs is carried out following the procedure of Example 1 except that vinylidene fluoride monomer is added immediately after the second evacuation of purge nitrogen. The reaction times range from 3.55 to 4.36 hours. Reaction temperature is 50° C. The average polymerization rate is 127 g./liter x hour. The conversions range from 87.5 to 94.7% with an average conversion of 92%. The elimination of a final nitrogen addition to the reactor prior to charge of reactants and polymerization increases the molecular weight of the polymer, as compared to the preceding series, due to higher initial monomer concentration. The polymer product from the eight runs has the following properties:

| Property | Minimum | Maximum | Average |
|---|---|---|---|
| Brabender value, m-g | 1,740 | 1,860 | 1,790 |
| Plasticity number, mm.² | 2,650 | 2,925 | 2,780 |
| Melt viscosity, poise | 23,785 | 27,150 | 25,480 |
| Color rating | (¹) | (¹) | (¹) |

¹ All fair plus.

EXAMPLE 3

The procedure of Example 1 is followed in a series of three runs except that total vinylidene fluoride monomer feed is increased to 3300 g. and the other ingredients (except water) increased proportionately, i.e., a 700 ml. solution made up of 23 g. of IPP initiator, 1030 g. of $CCl_2FCClF_2$ and 46 g. of acetone is fed incrementally and simultaneously with incremental monomer feed. Polymerization times range from 4:15 to 4:24 hours. Reaction temperature is 50° C. The average polymerization rate is increased to 146 g./liter x hour and the yields are 91.8 to 92.6% with an average of 92.3%. The characteristics of the product polymer are as follows:

| Property | Minimum | Maximum | Average |
|---|---|---|---|
| Brabender value, m-g | 1,585 | 1,730 | 1,645 |
| Plasticity number, mm.² | 2,925 | 3,125 | 3,025 |
| Melt viscosity, poise | 20,290 | 22,700 | 21,340 |
| Color rating | (¹) | (¹) | (¹) |

¹ All fair plus.

EXAMPLE 4

The procedure and recipe of the preceding example are followed in three runs except that the amount of acetone is increased to 79 grams and the amount of $CCl_2FCClF_2$ is decreased to 948 grams. Polymerization times range from 4:52 to 5:09 hours and the average polymerization rate is somewhat lower at 121 g./liter x hour. The polymerization temperature is 50° C. The polymer product, which has a lower molecular weight, is characterized by the following properties.

| Property | Minimum | Maximum | Average |
|---|---|---|---|
| Brabender value, m-g | 1,120 | 1,200 | 1,155 |
| Plasticity number, mm.² | 3,600 | 3,675 | 3,635 |
| Melt viscosity, poise | 13,150 | 13,700 | 13,395 |
| Color rating | (¹) | (¹) | (¹) |

¹ All fair plus.

EXAMPLE 5

The procedure and recipe of Example 1 are used in four runs except that the monomer charge is increased from 2840 g. to 3300 g. The average polymerization rate is 120 g./liter x hour. The vinylidene fluoride polymer product, which has a slightly higher molecular weight, is characterized by the following properties.

| Property | Minimum | Maximum | Average |
|---|---|---|---|
| Brabender value, m-g | 1,815 | 1,940 | 1,890 |
| Plasticity number, mm.² | 2,750 | 3,025 | 2,820 |
| Melt viscosity, poise | 21,910 | 24,845 | 23,220 |
| Color rating | (¹) | (¹) | (¹) |

All fair plus.

EXAMPLE 6

In a series of five runs, the horizontal, stainless steel autoclave equipped with paddle agitator is charged with 4767 ml. deionized water and 270 ml. of a 0.5% aqueous solution of hydroxypropyl cellulose ("Methocel 65 HG") as suspension agent. The reactor is sealed and evacuated, purged with nitrogen, and again evacuated to remove all traces of oxygen, and then 35 grams of IPP initiator, dissolved in 518 grams $CCl_2FCClF_2$ is added. Agitation is commenced and the reaction is pressurized with vinylidene fluoride monomer to 500 p.s.i.g. while the contents are heated to 45° C. during the run. A total of 2013 grams monomer is fed to the polymerizer, over a period ranging from 2:25 to 3:00 hours. The average polymerization rate is determined to be 222 grams/liter x hour. The vinylidene fluoride polymer product, quite inconsistent from run to run, has the following properties.

| Property | Minimum | Maximum | Average |
|---|---|---|---|
| Brabender valve, m-g | 2,340 | 3,340 | 2,835 |
| Plasticity number, mm.² | 2,300 | 2,775 | 2,540 |
| Melt viscosity, poise | 19,300 | 36,400 | 27,490 |
| Color rating | (¹) | (¹) | (¹) |

¹ All barely fair.

I claim:
1. In the process of preparing vinylidene fluoride polymer by suspension polymerization of monomer in stirred aqueous reaction medium containing a suspending agent, the improvement which comprises feeding incrementally or substantially continuously to the reaction medium the monomer, and simultaneously therewith diisopropylperoxydicarbonate, 1,1,2-trichlorotrifluoroethane and acetone, the feed rates thereof being such that the conversion of monomer to polymer is within the range of about 30 to 250 grams per liter of reaction mixture per hour, the proportions of such ingredients being within the range of about 0.05 to about 1.5 percent of diisopropylperoxydicarbonate, 10 to 50 percent of trichlorotrifluoroethane, and about 0.5 to 5.5 percent of acetone, said amounts being in percent by weight based on the total amount of monomer fed to the reaction, the temperature of the polymerization being within the range of 35° C. to 110° C. and the pressure within the range of about 300 to 1000 p.s.i.

2. The process according to claim 1 wherein up to about 20% of the total monomer is charged to the aqueous reaction medium prior to the addition of the other said ingredients.

3. The process according to claim 1 wherein the diisopropylperoxydicarbonate is 0.15 to 1 percent, the trichlorotrifluoroethane is 20 to 30 percent, and the acetone is 1 to 3 percent, based on weight of monomer feed.

4. The process according to claim 3 wherein the rate of feed is such that conversion of monomer to polymer is from 60 to 150 grams/liter per hour.

5. The process according to claim 3 wherein the polymerization temperature is in the range of 40 to 85° C. and pressure is in the range of 400 to 700 p.s.i.

References Cited
UNITED STATES PATENTS

| | | | |
|---|---|---|---|
| 3,475,396 | 10/1969 | McCain et al. | 260—92.1 |
| 3,553,185 | 1/1971 | Amagi et al. | 260—92.1 |
| 3,574,178 | 4/1971 | Toyoda et al. | 260—92.1 |

HARRY WONG, JR., Primary Examiner

U.S. Cl. X.R.

260—29.6 F, 80.77, 87.7